Patented Apr. 5, 1932

1,853,005

UNITED STATES PATENT OFFICE

RONALD V. MORGENSTERN, OF IRVINGTON, NEW YORK, ASSIGNOR TO THE WESTERN UNION TELEGRAPH COMPANY, OF NEW YORK, N. Y., A CORPORATION OF NEW YORK

REPEATER SYSTEM

Application filed February 18, 1930. Serial No. 429,421.

This invention relates to telegraph circuits and in particular to vacuum tube repeaters for telegraph circuits.

An object of the invention is to provide an amplifying repeater in which a three electrode thermionic vacuum tube is used to control the generation of current by a dynamo electric unit.

A further object of the invention is to provide a duplex repeater of the type referred to.

Specifically, the invention involves a duplex vacuum tube repeater in which the output circuit of the tube controls the supply of positive and negative currents, varying in accordance with the signals to be repeated, to the field of a dynamo-electric generator.

A specific object of the invention is to reshape the amplified or repeated wave to correct for line distortion. A means for this purpose may be the novel bridge of my invention described hereinafter.

In one form of the invention a pair of thermionic vacuum tubes are used with their output circuits normally balanced so that their effects on the field of the repeating generator are neutralized. The incoming signal is applied in opposite senses to the control electrodes of the tubes to upset the balance, and the resultant current variations in the output circuits are caused to act cumulatively upon the field of the generator to produce in its armature a varying current which at any instant corresponds in polarity to the incoming signal but has a considerably greater amplitude.

In another form of the invention a single thermionic vacuum tube is used and its anode current is normally balanced against a constant current which may be adjustable in value. The polarity of current supplied to the field of the repeating generator is controlled differentially by the two opposed currents. The incoming signal upsets the balance to increase or decrease the anode current in the output circuit of the vacuum tube and to thus control the polarity of current supplied to the generator field.

In accordance with this invention the input circuits of a pair of thermionic vacuum tubes are energized by signaling energy impressed upon them from one section of a metallic transmission circuit and a bridge balanced for duplex operation by a suitable artificial line. When the grid electrode of one of the thermionic vacuum tubes has impressed upon it a signal of positive potential the other has impressed upon it a corresponding negative potential. The field windings of a generator unit in the plate circuits of the tubes are controlled in accordance with the signaling energy impressed upon the grid circuits, and the generator is caused to transmit an electric current varied in accordance with the variations in its excitation current to the split points of another balanced bridge connected between the other section of the transmission line and a suitable artificial line. Signaling energy is transferred from this latter transmission line to the former by a similar arrangement.

A modified form of this invention employs a single thermionic vacuum tube energized from one section of a transmission line and its associated bridge and artificial line by a transformer arrangement such as is set forth in my copending application Serial No. 430,075, filed Feb. 20, 1930. In that application the windings of an electromagnetic relay are connected in the output circuit of the thermionic vacuum tube. A field circuit of a generator is arranged to be energized in accordance with signaling energy through the operation of the electromagnetic relay. Signaling energy is transmitted from the armature of this generator to the split points of the balanced bridge connected between the other section of the transmission line and its balancing artificial line or network.

This invention will be more fully understood by reference to the drawings in which.

Figure 1:
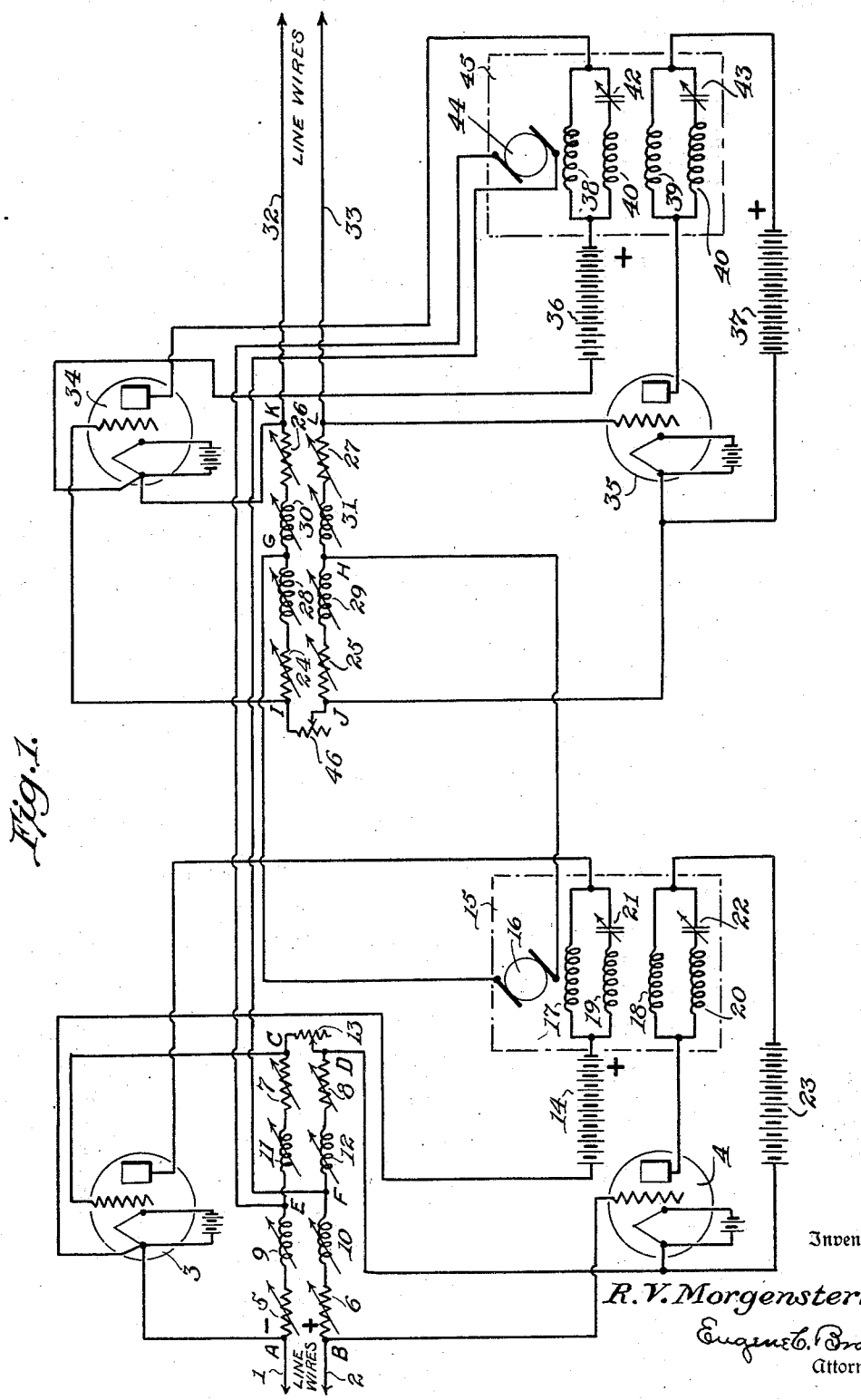
Figure 1 illustrates a duplex telegraph repeater.

Referring to Figure 1 of the drawings reference numerals 1 and 2 designate line wires of a transmission circuit. The cathode of thermionic vacuum tube 3 is connected to point A where the line 1 is connected to a bridge made up of four resistances 5, 6, 7 and 8 and four inductance coils 9, 10, 11 and 12, the latter wound on a common core. The resistances and inductances are preferably adjustable. The grid of thermionic vacuum tube 4 is connected to point B of the bridge or symmetrical network, where the line 2 is connected to the variable resistance 6. The point C of the bridge is connected to the grid electrode of the thermionic vacuum tube 3. The point D of the bridge is connected to the cathode of the thermionic vacuum tube 4.

A source of anode current supply 14 is connected between the cathode of tube 3 and a terminal of the field winding 17 of generator 15. The other terminal of the winding 17 is connected to the anode of the thermionic tube 3. An auxiliary winding 19 is connected in series with a variable condenser 21 across the field 17. The capacity of the condenser 21 is adjusted to increase the field current through the field 19 as the frequency of the signaling energy increases in order to compensate for the greater frequency attenuation of the transmission line at the higher frequencies. This field circuit arrangement is more fully set forth in a copending application of Ronald V. Morgenstern entitled "Repeaters for signaling circuits" Serial No. 426,676 filed February 7, 1930.

The source of anode current supply 23 is connected between the cathode of thermionic vacuum tube 4 and the field winding 18 of generator 15. The field winding 18 is arranged in opposition to the field winding 17 so that normally the resultant magnetic flux is zero. Another auxiliary field winding 20 is connected in series with the variable condenser 22 and in shunt with the winding 18, to compensate for the frequency attenuation of the lines at the higher frequencies.

The armature 16 of the generator 15 is connected across points G, H of the bridge which includes the variable resistances 24, 25, 26, and 27, and the variable inductances 28, 29, 30 and 31. This bridge is connected in balancing relation between the other section of the transmission line comprising lines 32 and 33 and its corresponding artificial line 46.

Signaling energy impressed upon the lines 32 and 33 from the armature 16 does not affect the input circuits of the thermionic vacuum tubes 34 and 35 since the points I and K to which the tube 34 is connected are at the same potential and polarity with respect to the point G when the bridge is properly balanced. The points J and L are likewise at the same potential and polarity with respect to the point H. The thermionic vacuum tube 35 is connected to the points J and L.

Source of anode current supply 36 is connected between the cathode of tube 34 and the field winding 38 of the generator 45. The source of anode current supply 37 is connected to the cathode of tube 35 and the field winding 39. The magnetic field set up by the winding 38 is in opposition to that set up by the winding 39. Additional windings 40 and 41 are connected in series with variable condensers 42 and 43.

The symmetrical networks which have been described as comprising four adjustable resistances and four adjustable inductances arranged in balancing relation to form a bridge, may serve the additional function of correcting for the distortion of the incoming signal wave applied to the grid electrodes of the balanced thermionic vacuum tubes. For this purpose not only must all the arms be adjusted to have the same final values of inductance and resistance, but in addition the value of inductance and resistance and the relations between the two must be so chosen that the bridge will act as a wave shaping device. That is, the bridge must produce relatively greater voltage drops across the vacuum tube input circuits for the higher frequencies which suffer relatively greater attenuation during transmission over the line.

The operation of the arrangement illustrated in Figure 1 is as follows: Signaling energy is transmitted to the repeater station either from the lines 1 and 2 or from the lines 32 and 33 when the system is arranged for duplex operation. When the signals are transmitted to the repeater station from lines 1 and 2 the points A and B will be of opposite polarity, that is, the signaling energy will cause either A to be positive with respect to B or B to be positive with respect to A. In case the point B is positive with respect to A the potential of the grid electrode of tube 4 will increase with respect to that of the filament and the anode current through this tube and through the field winding 18 will increase. The potential of the grid electrode of the tube 3 will be decreased or made less positive by the signal and the current through the field winding 17 will decrease. It is here assumed that the thermionic vacuum tubes 3 and 14 are operated on the linear portion of their grid potential-plate current characteristic curves. Since the field windings 17 and 18 are energized by the anode currents of tubes 3 and 4, respectively, any increase or decrease in these anode currents by the signals impressed upon the input circuits of these tubes will effect the excitation of the generator 15 and electric currents corresponding to these signals will be transmitted to the lines 32 and 33 from this generator.

Signals transmitted to the repeater station over the lines 32 and 33 are impressed upon the circuits of thermionic vacuum tubes 34 and 35 and caused to vary the excitation of the generator 45 which transmits electric currents to the lines 1 and 2 in a similar manner.

Figure 2:
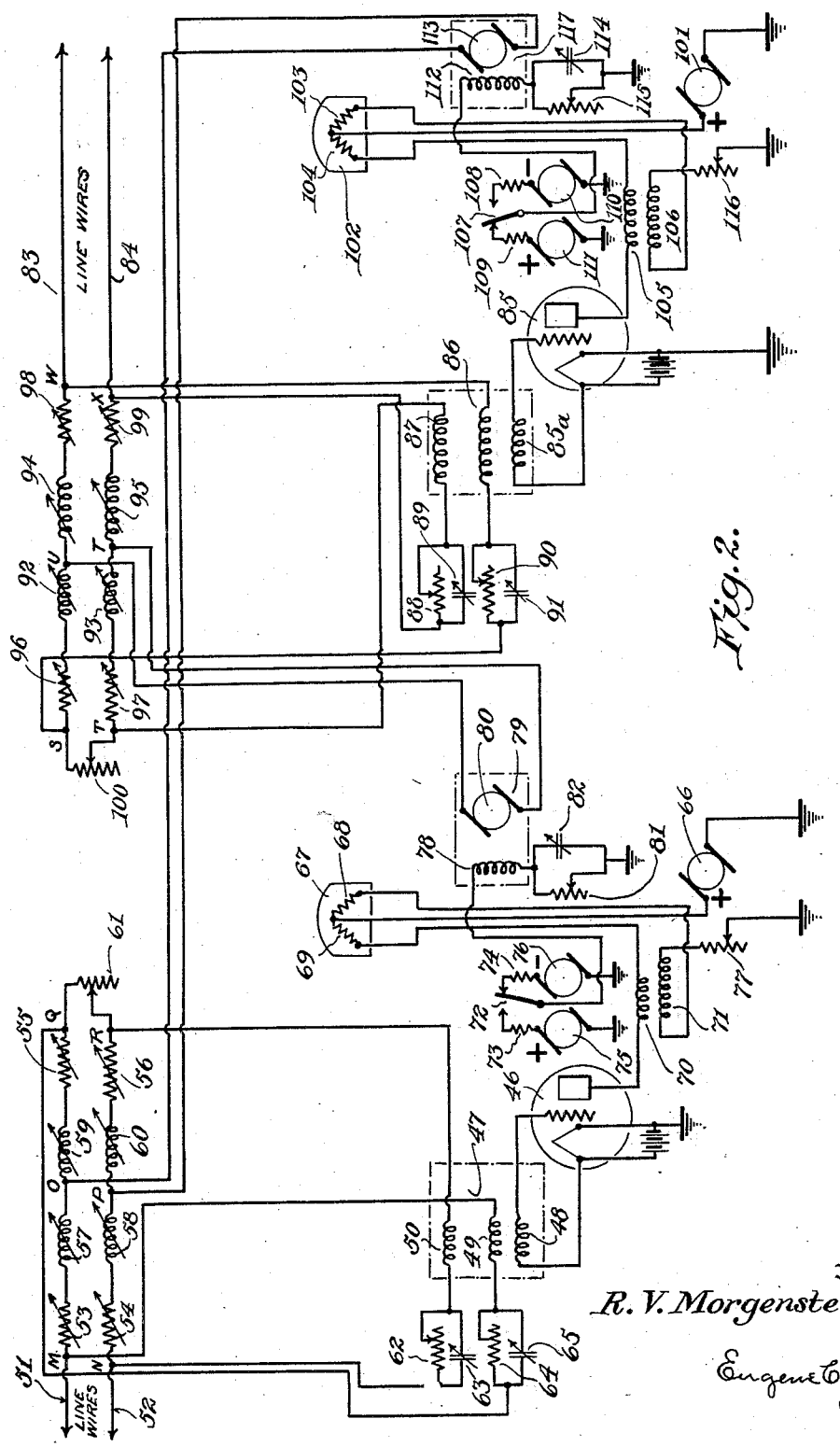
Figure 2 illustrates a modified arrangement thereof.

In Fig. 2 of the drawings is illustrated an arrangement in which the input circuit of thermionic vacuum tube 46 is coupled to the lines 51 and 52 and its associated bridge through the operation of the transformer 47. The secondary 48 of this transformer is connected to the grid electrode and cathode of the tube 46. The primary 50 is connected to the bridge at the points N and R through the variable resistance 62 which is shunted by the variable condenser 63. The primary 49 is connected to the bridge at points M and Q in the opposite sense to that in which the primary 50 is connected to points N and R. The primary windings 49 and 50 of the transformer 47 must be substantially identical with respect to their numbers of turns and they must occupy the same relative positions on the core. The variable inductance units 57, 58, 59 and 60 of the bridge are wound upon a single core. This feature is set forth in my copending application, Serial No. 390,341, filed September 4, 1929, issued Jan. 6, 1931, as Patent No. 1,788,316.

The thermionic vacuum tube 46 is supplied from a source 66 which is grounded at one terminal and connected at its other terminal to both windings of a differential meter 67. One winding 68 of the meter is connected in series with a winding 71 of a polarized relay and through a variable resistance 77 to ground. The other meter winding 69 is connected in series with the winding 70 of the polarized relay, thence to the plate of vacuum tube 46. The resistance 77 is adjusted to vary the current through winding 68 of the differential meter until the meter indicates that the current is just equal to that flowing through winding 70 in the anode circuit of the vacuum tube. The polarized relay is so arranged that when no signal is received the magnetic fields of the equal currents flowing through its two windings 70 and 71 neutralize one another.

When a signal is impressed upon the input circuit of the thermionic tube 46 in such a manner that the anode current is caused to increase, the magnetic field of the winding 70 will increase over that of winding 71 and cause the armature 72 to engage a contact thereof which is connected to the resistance 73 and the generator 75. Thereupon the field winding 78 of the generator 79 will be energized by positive current and a signal of positive polarity will be transmitted over the lines 83 and 84 from the armature 80. A variable resistance 81 shunted by a variable capacity 82 is connected in series with the field winding 78 for the purpose of compensating for line distortion of signals.

When the signal impressed upon the input circuit of the tube 46 through the combined effect of the primaries 49 and 50 upon the secondary 48 of the transformer 47, is such as to cause the anode current of this tube to decrease below its normal value, the magnetic field set up by the winding 70 will be of lesser magnitude than that set up by the winding 71 and the armature 72 which is magnetically controlled by the fields of coils 70 and 71, will be caused to engage a contact connected to the resistance 74. Thereupon a current from the source 76 is caused to flow through the field 78 in a negative direction and the armature 80 is caused to impress a signal of negative polarity on the lines 83 and 84.

The thermionic vacuum tube 85 is arranged with its cathode and grid electrode connected to the secondary 85a of the input transformer. The primary 86 of the input transformer is connected in series with the correcting network comprising variable condenser 91 shunted by variable resistance 90, and to the points S and W of a second bridge similar to the first. This bridge includes the variable resistances 96, 97, 98 and 99 and the variable inductances units 92, 93, 94 and 95 interposed between the lines 83 and 84 and the artificial line 100. The primary 87 is connected to the points X and T through the variable condenser 89 and the variable resistance 88 in shunt thereto. The primaries 86 and 87 are connected to the bridge associated with the lines 83 and 84 in such a direction that the magnetic fields set up in these primaries by incoming signaling currents received from the lines 83 and 84 will aid each other in energizing the input circuit of the thermionic vacuum tube 85, while the magnetic effects produced in these primary windings 86 and 87 by signaling currents impressed upon the network of the lines 83 and 84 at the points U and V through the operation of the generator 79 will neutralize each other.

A source of anode current supply 101 is connected to the anode of the tube 85 through the windings 104 of the differential meter 102 and the winding 105. The relay windings 105 and 106 are operatively associated with the armature 107. A variable resistance 116 is connected to the winding 106 which is connected to the source of current supply 101 through the winding 103 of the differential meter 102. The winding 106 is arranged to be magnetically opposed to the winding 105. The current through the winding 106 is adjusted by varying the resistance of the unit 116 until the differential meter 102 indicates that this current is equal to the current flowing through the winding 105. When this condition is obtained the magnetic field of the windings 105 and 106 neutralize each other and the armature 107 is not operated. When the input of the tube 85 is energized by a signal of positive polarity and the current through the tube is caused to increase, the magnetic field of the winding 105 will predominate over that of winding 106 and the armature 107 will be caused to engage the contact associated with the resistance 109. Thereupon a current flows from the source of current supply 111 through the field winding 112 of the generator 117. A signal of positive polarity is then transmitted to the lines 51 and 52 through the operation of the generator 117, the armature 113 of which is connected to the points O and P of the bridge associated with lines 51 and 52. When a signal of negative polarity is impressed upon the tube 85 the current through the winding 105 is caused to decrease. The relay armature 107 will be caused to complete the circuit through the resistance 108 whereby a current from the source of current supply 110 flows through the winding 112 of the generator 117. A signal of negative polarity is then impressed upon the lines 51 and 52. A signal shaping circuit including the variable resistance 116 and the variable condenser 114 in parallel is connected in series with the field 112 to compensate for frequency attenuation of the transmission lines.

While I have set forth the embodiment of this invention in considerable detail, it is, of course, understood that various modifications thereof may be made without departing from the spirit thereof.

I claim:

1. In a signaling system the combination of a thermionic vacuum tube, means for impressing signaling energy upon the input circuit of said thermionic vacuum tube, a relay associated with the output circuit of said thermionic vacuum tube, a generator unit, said relay being arranged to control the direction of current flow through a field winding of said generator.

2. In a signaling system the combination of a thermionic vacuum tube, means for impressing signaling energy upon the input circuit of said thermionic vacuum tube, a relay having a plurality of windings, one of said windings being energized by the anode current of said thermionic vacuum tube, means for controlling the current through another of said windings, said last mentioned winding being arranged to oppose its magnetic field to that of said first mentioned winding, and means under control of said thermionic vacuum tube to vary the magnetic field of said first mentioned winding to thereby control the operation of said relay in accordance with signaling energy.

3. In a signaling system the combination of a thermionic vacuum tube, means for impressing signaling energy upon the input circuit of said thermionic vacuum tube, a relay having a plurality of windings, one of said windings being arranged to normally oppose and neutralize the magnetic effects of another of said windings, connections between said thermionic vacuum tube and one of said windings whereby the operation of said relay may be controlled by signaling energy impressed upon the input circuit of said tube, a generator, and means under control of said relay to vary the field of said generator.

4. In a signaling system the combination of a relay having a plurality of windings, one of said windings being arranged to normally oppose and balance the magnetic effects of another of said windings, said first mentioned winding being associated with a signal transmission system whereby signaling energy may be impressed upon the circuit thereof, a generator, connections between the field winding of said generator and said relay whereby said relay is arranged to control the current flow through said field winding in accordance with signaling energy.

5. In a signaling system the combination of a relay having a plurality of windings, a source of current supply for energizing said windings, certain of said windings being arranged to oppose the magnetic effects of another of said windings whereby a condition of magnetic balance is obtained in said relay windings, means for indicating this condition of magnetic balance, a generator, connections between the field winding of said generator and said relay, means for impressing signaling energy upon a selected circuit of said relay for controlling the operation thereof whereby the energization of said field winding is controlled in accordance with signaling energy.

6. In a signaling system the combination of a signal transmission line, a balancing line and a balanced bridge network therefor, a thermionic tube connected to conjugate points of said bridge network, a relay in the output circuit of said tube, and a generator having its field winding under control of said relay.

7. In a signaling system the combination of a pair of signal transmission lines, a balancing line and a balanced bridge network for each transmission line, thermionic vacuum tube repeaters connected in conjugate paths between said bridge networks, a generator in each path and means under control of said vacuum tube repeaters for varying the field of its associated generator in accordance with incoming signals.

8. In a signaling system the combination of a pair of signal transmission lines, artificial lines therefor, a balancing bridge network connected between each transmission line and its artificial line to produce a pair of conjugate paths extending from the split points of one bridge to the terminals of the other bridge, vacuum tube repeaters associated in input relation to the said terminals of each bridge, a generator connected to the split points of each bridge and means under control of the vacuum tube repeaters for determining the polarity of current supplied by the generator to the split points of its associated bridge.

9. In a signaling system the combination of a pair of signal transmission lines, artificial lines therefor, a balancing bridge network connected between each transmission line and its artificial line, a pair of input paths connected to the pairs of terminals of the bridge network, and adapted to supply signaling voltages of changing polarity to a vacuum tube repeater, a generator connected to the split points of the bridge and means under control of the output of said vacuum tube repeater for changing the polarity of current supplied to the field of said generator.

10. The combination according to claim 9 in which the bridge network comprises resistance and inductance designed to reform the incoming signal wave to correct for line distortion.

In testimony whereof I affix my signature.

RONALD V. MORGENSTERN.